No. 707,400. Patented Aug. 19, 1902.
G. P. DORRIS.
TRANSMISSION GEAR FOR AUTOMOBILES.
(Application filed Apr. 4, 1901.)
(No Model.)
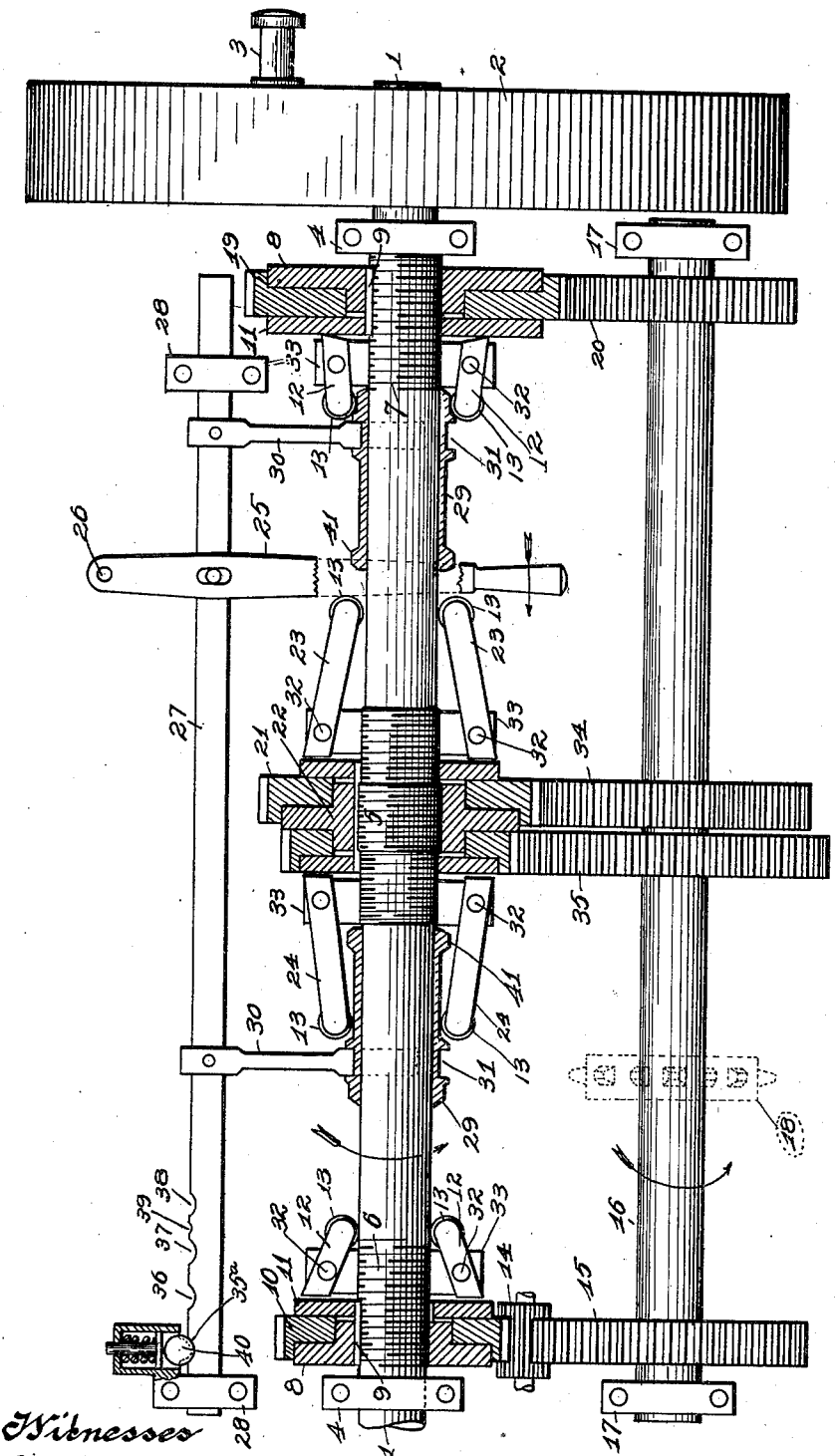
Witnesses
Inventor
George P. Dorris.
By Higdon & Longan, Attys

UNITED STATES PATENT OFFICE.

GEORGE P. DORRIS, OF ST. LOUIS, MISSOURI.

TRANSMISSION-GEAR FOR AUTOMOBILES.

SPECIFICATION forming part of Letters Patent No. 707,400, dated August 19, 1902.

Application filed April 4, 1901. Serial No. 54,294. (No model.)

*To all whom it may concern:*

Be it known that I, GEORGE P. DORRIS, of the city of St. Louis, State of Missouri, have invented certain new and useful Improvements in Transmission-Gear for Automobiles, of which the following is a full, clear, and exact description, reference being had to the accompanying drawings, forming a part hereof.

This invention relates to transmission-gears for automobiles; and it consists of the novel construction, combination, and arrangement of parts hereinafter shown, described, and claimed.

The object of my invention is to provide an improved transmission-gear which shall be very simple in construction and operation and which shall provide for numerous changes of speed by the movement of a single lever.

My invention is specially applicable to automobiles driven by hydrocarbon-motors, inasmuch as in that class of vehicles the motor runs continuously in a given direction and is connected or disconnected by means of one or more suitable clutches.

In the drawing the figure is a sectional plan view of a transmission-gear embodying my invention.

1 indicates the power-shaft, which in the present case is the engine-shaft, having mounted upon one end the fly-wheel 2 and crank-pin 3. However, in some cases the shaft 1 may be driven indirectly by means of a chain or pulleys or friction-gearing. The shaft 1 is mounted in suitable bearings 4, carried by the frame of the automobile, and is provided with a series of screw-threaded portions, there being in the present case a central screw-threaded portion having an enlargement 5 and a screw-threaded portion 6, adjacent one end, and a threaded portion 7, adjacent the opposite end, of the shaft. Mounted upon the screw-threaded portion 6 is a friction-clutch composed of the usual rigid member 8, which is keyed to the shaft by means of the key 9, the gear-wheel 10, the friction-plate 11, and the clutch-arms 12, which latter are provided with the usual antifriction-rolls 13. The clutch at this end of the shaft is preferably used as the "reversing-clutch" in backing the vehicle, and its gear-wheel 10 meshes with the wheel or pinion 14 and this in turn with the wheel 15 on the countershaft 16, which latter is mounted in bearings 17 and provided with the usual sprocket-wheel 18 or other device whereby power may be transmitted to the axle of the automobile by means of a sprocket-chain, belt, or gear-wheels. It will be seen that when the said shaft 1 is revolved in a given direction the counter-shaft 16 will revolve in the same direction when the reversing-clutch is "thrown in." Another clutch, similar to that just described, but having a larger gear-wheel 19 and coöperating members, is mounted near the opposite end of the said shaft 1, adjacent the fly-wheel 2, and this clutch I term the "high-speed" clutch, inasmuch as it will drive the counter-shaft 16 at its highest speed, it being geared direct by means of a wheel 20. The "medium" clutch has a slightly-smaller gear-wheel 21 and is located near the center of the length of said shaft 1, its fixed member 22, however, having opposite faces, whereby the "low-speed" gear-wheel $22^a$ may be urged into contact with said fixed member on the side thereof opposite the gear-wheel 21. The medium clutch-arms 23 and the low-speed clutch-arms 24, as well as the "reverse-clutch" arms and the high-speed clutch-arms, are all operated in the present instance by a single hand-lever 25, which may be pivoted at 26 to some fixed part of the automobile. This hand-lever is preferably connected to move a single clutch-bar 27 longitudinally in its bearings 28 and "throw in" or release successively the several clutches in the order shown. This may be accomplished by means of the construction now to be described.

A series of sleeves 29 is mounted to slide loosely on the shaft 1, and each sleeve is "double-ended"—that is, it has a tapered end which is adapted to run beneath the rollers 13 of the adjacent clutch-arms. The number of sleeves 29 depend upon the number of clutches made use of, there being, preferably, as before stated, two clutches for each sleeve. Connection is made between the clutch-bar 27 and the sleeves 29 by means of fingers 30, which extend from said bar to the said sleeves and engage an annular groove 31, formed in the said sleeves 29, so that whenever said bar is moved longitudinally said sleeves will all move a corresponding distance on said shaft 1. The clutch-arms of all the clutches are fulcrumed at 32 to fulcrum-plates 33, which are perforated centrally and threaded upon said shaft 1 in the manner common to clutches of this construction. The gear-wheel 21 of the medium clutch meshes with a gear-wheel 34, carried by the counter-shaft 16, and the low-speed gear-wheel 22ª meshes with a gear-wheel 35, carried by said shaft. It will be observed that the said sleeves 29 have a definite length and that the contiguous clutches which each sleeve operates are located a definite distance apart corresponding to the length of the sleeve which controls said clutches. The purpose of this will hereinafter appear.

For retaining in position the clutch-bar 27 and the sleeves 29 I may provide any known locking arrangement; but in the present case I have shown said bar 27 provided with a series of notches or recesses 35ª 36 37 38 and a small notch 39 and have arranged the spring-pressed roller or projection 40 to engage any one of said notches.

It will be observed that I have provided means for controlling a series of four or less clutches by the movement of a single lever in one direction. In other words, there is a system of two or more clutches set and relieved by one continuous movement in a given direction and so arranged that it is impossible to set but one clutch at a time, each clutch being successively relieved before the next is set.

The operation is as follows: The drawings show the high-speed clutch adjacent the fly-wheel set, one end of its sleeve 29 having ran between the rollers 13 and the said shaft 1, and thereby caused the clutch-arms 12 to force the friction-plate 11 into contact with the gear-wheel 19 and the latter into engagement with the fixed part 8, thereby causing said shaft to rotate said gear-wheel and communicate motion to the gear-wheel 20 and the counter-shaft 16, whence motion may be communicated to the automobile by way of the sprocket-wheel 18 or other suitable connections. The retaining-roller 40 now rests in the notch 35ª of the clutch-bar 27. By now moving the hand-lever 25 in the direction indicated by the arrow the sleeve 29, which operates said clutch, will slide on said shaft 1 and the rollers 13 will run off the tapering end of said sleeve, thereby releasing said high-speed clutch, and as the movement of said hand-lever is continued in the same direction the opposite end of said sleeve will pass beneath the rollers of the medium clutch, thereby throwing outwardly the clutch-arms 23 and setting the said medium clutch, and as the said movement of said lever is further continued the sleeve 29 will be forced farther toward the said clutch and the rollers 13 thereof will roll off of the enlargement at said end of said sleeve and thereupon engage a portion of said sleeve which is of less diameter, which will release said clutch, and as the said movement of said lever continues the low-speed clutch will be set by reason of its clutch-arms 24 and rollers 13 being thrown outwardly by the enlargement 41 of its sleeve 29, and said rollers 13 will then rest upon the periphery of said enlargement and at the same time the retaining-roller 40 will rest in the notch 37, and then as said movement of said hand-lever continues said low-speed clutch will be released by its sleeve 29 being withdrawn from its rollers 13, and then the retaining-roller 40 should rest in the half-notch 39, thereby retaining the said clutch-bar 27 in such position that all of the clutches are released and the shaft 1 will be permitted to revolve freely without revolving any of the gear-wheels. Finally as the said movement of said hand-lever is continued the reversing-clutch will be set by reason of its rollers 13 being engaged by the adjacent end of its sleeve 29, thereby causing the gear-wheel 14 and the gear-wheel 15 to revolve the counter-shaft 16 in a reverse direction. Of course the movement of the hand-lever 25 in a direction opposite the arrow will cause the clutches to be operated in reverse order to that just described—that is, the reversing-clutch will be first released, then the retaining-roller 40 would rest in the half-notch 39, and the engine would be free to revolve without rotating any of the gear-wheels. Then the low-speed clutch would be set. Then the latter would be released and the medium clutch would be set, and finally the latter would be released and the high-speed clutch set. The advantages of such construction are its simplicity; a great number of parts may be made in duplicate, thereby reducing the cost; all gear-wheels will be at rest when the vehicle is at rest, although the engine continue in motion; light but durable construction; the power-shaft and bearings serve as a part of the transmission-gear; only one extra shaft and two extra bearings are employed; a minimum of bearings.

I claim—

1. A power-transmitting gear, comprising a power-shaft, a number of forward-propelling gears of various sizes and a rearward-propelling gear mounted loosely upon the power-shaft, a number of arms pivotally supported adjacent to each of said gears, a friction-plate interposed between each of said gears and its adjacent arms, sleeves mounted to slide upon the shaft and each sleeve being adapted to operate the arms at a plurality of the gears at different times when the said sleeves are moved continuously in a given direction, to set the friction-plates against the gears to hold the latter, so they will turn with the shaft, a clutch-bar, means for operating said clutch-bar, and connections between the clutch-bar and the sleeves, whereby they will all be moved simultaneously when the clutch-bar is operated, substantially as specified.

2. The combination in a power-transmitting gear, of a number of forward-propelling gears of various sizes and a rearward-propelling gear, a friction-clutch for each of said gears, sleeves constructed to set and release the clutches successively when said sleeves are moved continuously in a given direction and thereby move the driven mechanism forward at various speeds or reverse the same, a clutch-bar and connections between the clutch-bar and the said sleeves and a locking device for holding the clutch-bar in any position, substantially as specified.

3. The combination of a number of forward-propelling gears of various sizes arranged in regular order from the smallest to the largest and a rearward-propelling gear, all mounted on a single shaft, a series of friction-clutches mounted upon the same shaft with the gears, sleeves mounted to slide upon said shaft, each sleeve being adapted to operate a number of the clutches and thereby move the driven mechanism forward at various speeds or reverse the same by setting the clutch of the rearward-propelling gear, a clutch-bar and connections between the clutch-bar and the sleeves, whereby the latter will be operated to set and release all of said clutches successively when the clutch-bar is moved to the limit of its motion in a given direction, substantially as specified.

4. The combination of a series of three or more forward-propelling friction-clutches adapted to transmit variable speeds, a rearward-propelling clutch "double-ended" sleeves adapted to successively engage said clutches when moved continuously in one direction, and operative connections for moving said sleeves, substantially as specified.

In testimony whereof I affix my signature in presence of two witnesses.

GEORGE P. DORRIS.

Witnesses:
ALFRED A. EICKS,
JOHN C. HIGDON.